(12) United States Patent
Itzel et al.

(10) Patent No.: US 10,053,988 B2
(45) Date of Patent: Aug. 21, 2018

(54) ARTICLE AND METHOD OF FORMING AN ARTICLE

(71) Applicant: GENERAL ELECTRIC COMPANY, Schenectady, NY (US)

(72) Inventors: Gary Michael Itzel, Simpsonville, SC (US); Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 375 days.

(21) Appl. No.: 14/965,178

(22) Filed: Dec. 10, 2015

(65) Prior Publication Data

US 2017/0167270 A1 Jun. 15, 2017

(51) Int. Cl.
*F01D 5/18* (2006.01)
*B22F 3/105* (2006.01)
(Continued)

(52) U.S. Cl.
CPC ............ *F01D 5/187* (2013.01); *B22F 3/1055* (2013.01); *B22F 5/04* (2013.01); *B22F 7/06* (2013.01); *B23K 15/0086* (2013.01); *B23K 26/342* (2015.10); *B33Y 10/00* (2014.12); *B33Y 80/00* (2014.12); *F01D 9/041* (2013.01); *F01D 9/065* (2013.01); *F01D 25/12* (2013.01); *B22F 2005/005* (2013.01); *B23K 2201/001* (2013.01); *F05D 2220/32* (2013.01); *F05D 2230/31* (2013.01); *F05D 2260/202* (2013.01); *F05D 2260/2212* (2013.01);
(Continued)

(58) Field of Classification Search
CPC .......... F01D 5/187; F01D 9/041; F01D 25/12; B33Y 10/00; B33Y 80/00; B23K 15/0086; B23K 26/342; B23K 2201/001; B22F 5/04; B22F 3/1055; B22F 7/06; B22F 2205/005; F05D 2220/32; F05D 2230/31; F05D 2260/202; Y02P 10/295
See application file for complete search history.

(56) References Cited

U.S. PATENT DOCUMENTS 4,370,789 A 2/1983 Schilke et al.
5,353,865 A * 10/1994 Adiutori ................. F28F 13/02
165/109.1
(Continued)

FOREIGN PATENT DOCUMENTS

WO 2014023687 A1 2/2014

*Primary Examiner* — Igor Kershteyn
(74) *Attorney, Agent, or Firm* — McNees Wallace & Nurick LLC

(57) ABSTRACT

An article and method of forming an article are provided. The article includes a body portion having an inner surface and an outer surface, the inner surface defining an inner region, and at least one cooling feature positioned within the inner region. The body portion includes a first material and the at least one cooling feature includes a second material, the second material having a higher thermal conductivity than the first material. The method includes manufacturing a body portion by an additive manufacturing technique and manufacturing at least one cooling feature by the additive manufacturing technique. The body portion includes a first material and the at least one cooling feature includes a second material, the second material having a higher thermal conductivity than the first material.

20 Claims, 5 Drawing Sheets

(51) Int. Cl.
  *B22F 5/04* (2006.01)
  *B23K 15/00* (2006.01)
  *B23K 26/342* (2014.01)
  *B33Y 10/00* (2015.01)
  *B33Y 80/00* (2015.01)
  *F01D 25/12* (2006.01)
  *F01D 9/04* (2006.01)
  *B22F 7/06* (2006.01)
  *F01D 9/06* (2006.01)
  *B23K 101/00* (2006.01)
  *B22F 5/00* (2006.01)

(52) U.S. Cl.
  CPC .............. *F05D 2260/2214* (2013.01); *F05D 2260/22141* (2013.01); *F05D 2300/172* (2013.01); *F05D 2300/5024* (2013.01); *Y02P 10/295* (2015.11)

(56) References Cited

U.S. PATENT DOCUMENTS

| | | | | |
|---|---|---|---|---|
| 6,402,464 | B1* | 6/2002 | Chiu | F01D 5/288 |
| | | | | 165/133 |
| 6,598,781 | B2* | 7/2003 | Hasz | C23C 24/10 |
| | | | | 228/245 |
| 6,681,578 | B1* | 1/2004 | Bunker | F23R 3/005 |
| | | | | 60/759 |
| 2008/0226879 | A1* | 9/2008 | Strock | C23C 4/04 |
| | | | | 428/195.1 |
| 2010/0034647 | A1 | 2/2010 | Lee et al. | |
| 2013/0045093 | A1 | 2/2013 | Wunderlich et al. | |
| 2013/0122259 | A1* | 5/2013 | Lee | C23C 30/00 |
| | | | | 428/164 |
| 2014/0342175 | A1* | 11/2014 | Morrison | B22D 19/00 |
| | | | | 428/596 |
| 2016/0059437 | A1* | 3/2016 | Lacy | B28B 1/001 |
| | | | | 228/164 |

* cited by examiner

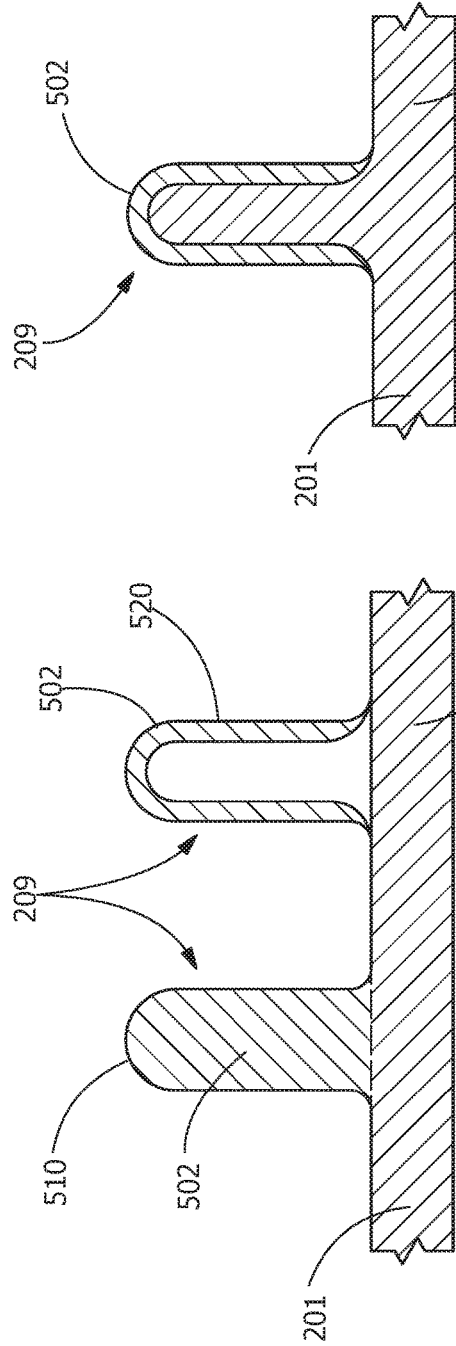
FIG. 5
FIG. 6
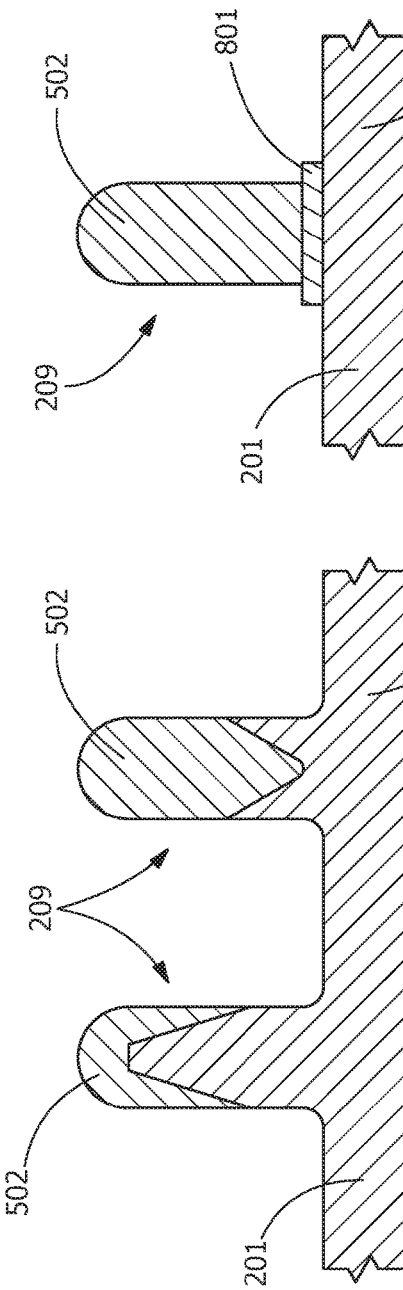
FIG. 7
FIG. 8

ARTICLE AND METHOD OF FORMING AN ARTICLE

FIELD OF THE INVENTION

The present invention is directed to an article and a method of forming an article. More particularly, the present invention is directed to a cooled article and a method of forming a cooled article.

BACKGROUND OF THE INVENTION

Turbine systems are continuously being modified to increase efficiency and decrease cost. One method for increasing the efficiency of a turbine system includes increasing the operating temperature of the turbine system. To increase the temperature, the turbine system must be constructed of materials which can withstand such temperatures during continued use.

One common method of increasing a temperature capability of a turbine component includes the use of cooling features. The cooling features are often formed from metals and alloys used in high temperature regions of gas turbines. Typically, the cooling features are cast on or within the component during manufacturing. Cooling features may also be formed through machining of the component after manufacture. However, it is difficult to form complex cooling features through casting and/or machining of the component.

Additionally, the cooling features formed through casting and/or machining of the component generally include the same material as the component. Although these materials are capable of withstanding the operating temperatures of the turbine system, they also include the same thermal conductivity as the component. Therefore, since the materials that withstand gas turbine operating temperatures often include relatively low thermal conductivity, so do the cooling features formed therefrom. Accordingly, current methods for cooling components usually include passing an increased amount of cooling fluid over the cooling features having a relatively low thermal conductivity, which decreases operating efficiency of the system.

BRIEF DESCRIPTION OF THE INVENTION

In an embodiment, an article includes a body portion having an inner surface and an outer surface, the inner surface defining an inner region, and at least one cooling feature positioned within the inner region. The body portion includes a first material and the at least one cooling feature includes a second material, the second material having a higher thermal conductivity than the first material.

In another embodiment, an article include a body portion having an inner surface and an outer surface, the inner surface defining an inner region, and at least one integral cooling feature extending from the inner surface. The body portion includes a first material and the at least one cooling feature includes a second material, the second material having a higher thermal conductivity than the first material and providing an increased cooling effectiveness as compared to the first material. Additionally, the body portion and the at least one integral cooling feature include an additive manufacturing microstructure.

In another embodiment, a method of forming an article includes manufacturing a body portion by an additive manufacturing technique and manufacturing at least one cooling feature by the additive manufacturing technique. The body portion includes a first material and the at least one cooling feature includes a second material, the second material having a higher thermal conductivity than the first material.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 5 is a section view of a cooling feature, according to an embodiment of the disclosure.

FIG. 6 is a section view of a cooling feature, according to an alternate embodiment of the disclosure.

FIG. 7 is a section view of a cooling feature, according to an alternate embodiment of the disclosure.

FIG. 8 is a section view of a cooling feature, according to an alternate embodiment of the disclosure.

Wherever possible, the same reference numbers will be used throughout the drawings to represent the same parts.

DETAILED DESCRIPTION OF THE INVENTION

Provided are an article and method of forming an article. Embodiments of the present disclosure, for example, in comparison to concepts failing to include one or more of the features disclosed herein, increase cooling efficiency, facilitate increased control of article cooling, increase article life, facilitate use of increased system temperatures, increase system efficiency, provide increased article cooling with decreased cooling fluid, or a combination thereof.

Figure 1:
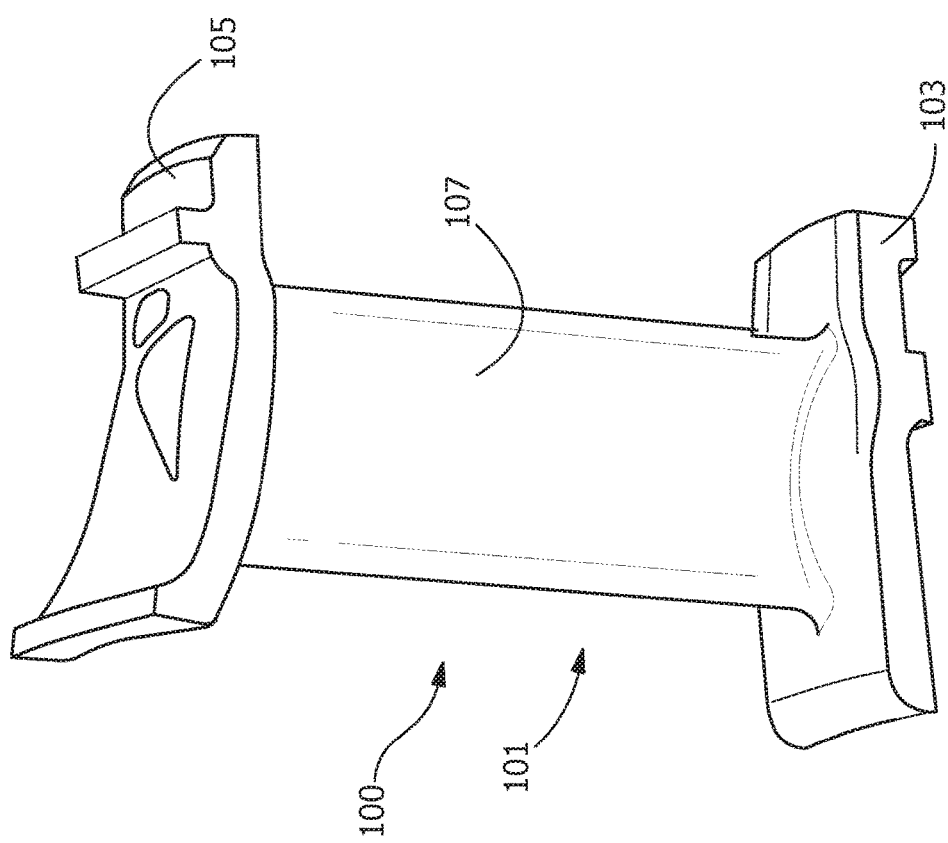
FIG. 1 is a front perspective view of an article, according to an embodiment of the disclosure.

Referring to FIG. 1, in one embodiment, an article 100 includes a nozzle 101 configured for use in a hot gas path of a turbine engine. In another embodiment, the nozzle 101 includes an airfoil portion 107 positioned between a first end wall 103 and a second end wall 105. The airfoil portion 107 is arranged and disposed to direct airflow through a portion of the hot gas path, and is configured to receive a cooling fluid through at least one of the first end wall 103 and the second end wall 105. Although described herein with regard to a nozzle, as will be appreciated by those skilled in the art, the article 100 is not so limited and may include any other article suitable for receiving a cooling fluid, such as, for example, a hollow component, a hot gas path component, a bucket, a blade, an airfoil, a shroud, a vane, a blade platform, vane side-walls, combustors, or a combination thereof.

Figure 2:
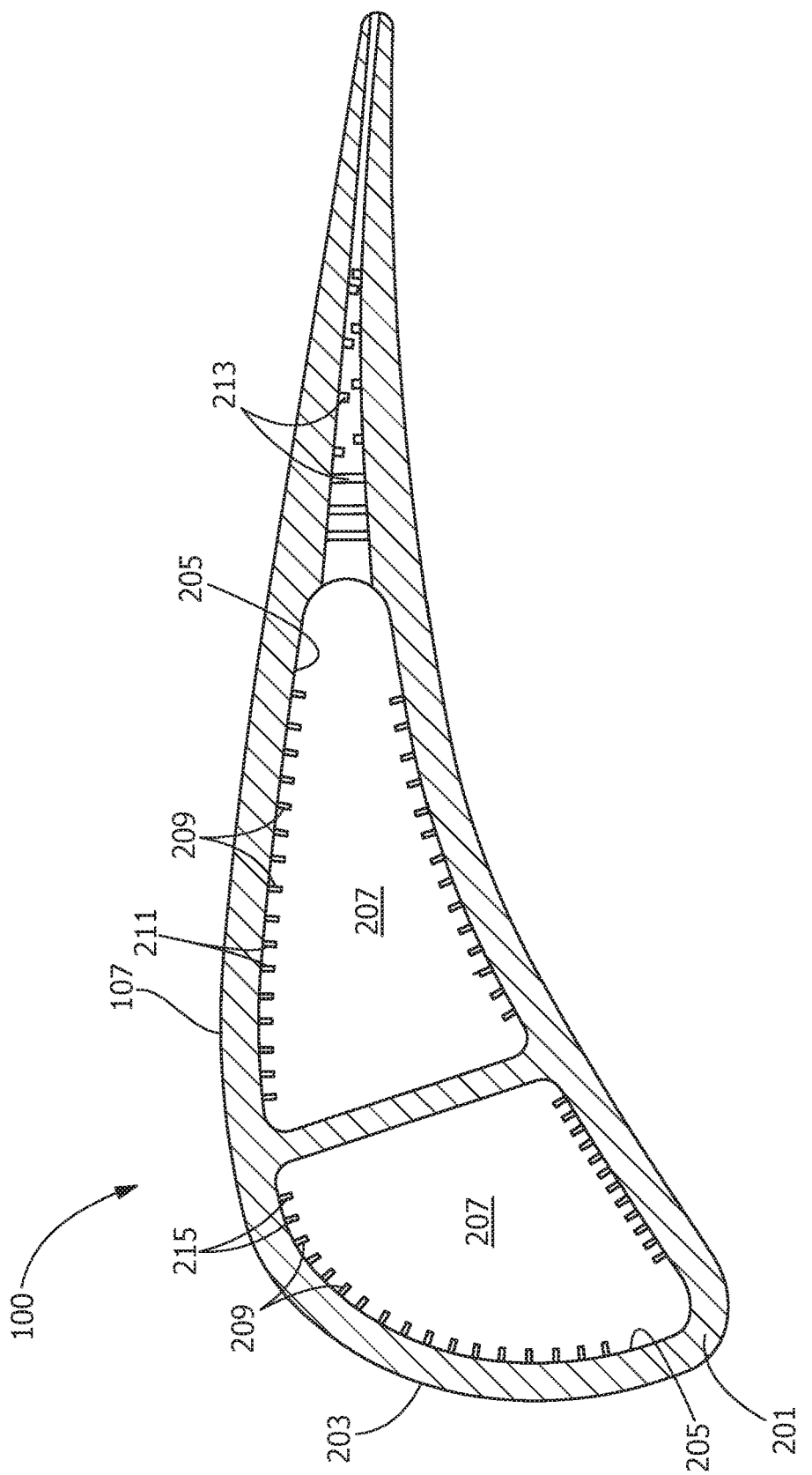
FIG. 2 is a section view of the article of FIG. 1, taken along the line 2-2, according to an embodiment of the disclosure.

As illustrated in FIG. 2, which shows a cross section of the airfoil portion 107, the article 100 includes a body portion 201 having an outer surface 203, an inner surface 205 defining an inner region 207, and one or more cooling features 209 formed therein. Suitable cooling features include, but are not limited to, turbulators 211, pins 213, bumps 215, dimples, fins, aperture, or a combination thereof. The one or more cooling features 209 are positioned in any suitable orientation within the inner region 207, such as on and/or extending from the inner surface 205, on and/or extending from an intermediate layer over the inner surface 205, on and/or extending from a component positioned within the inner region 207, any other orientation suitable for conductive cooling, or a combination thereof.

Figure 3:
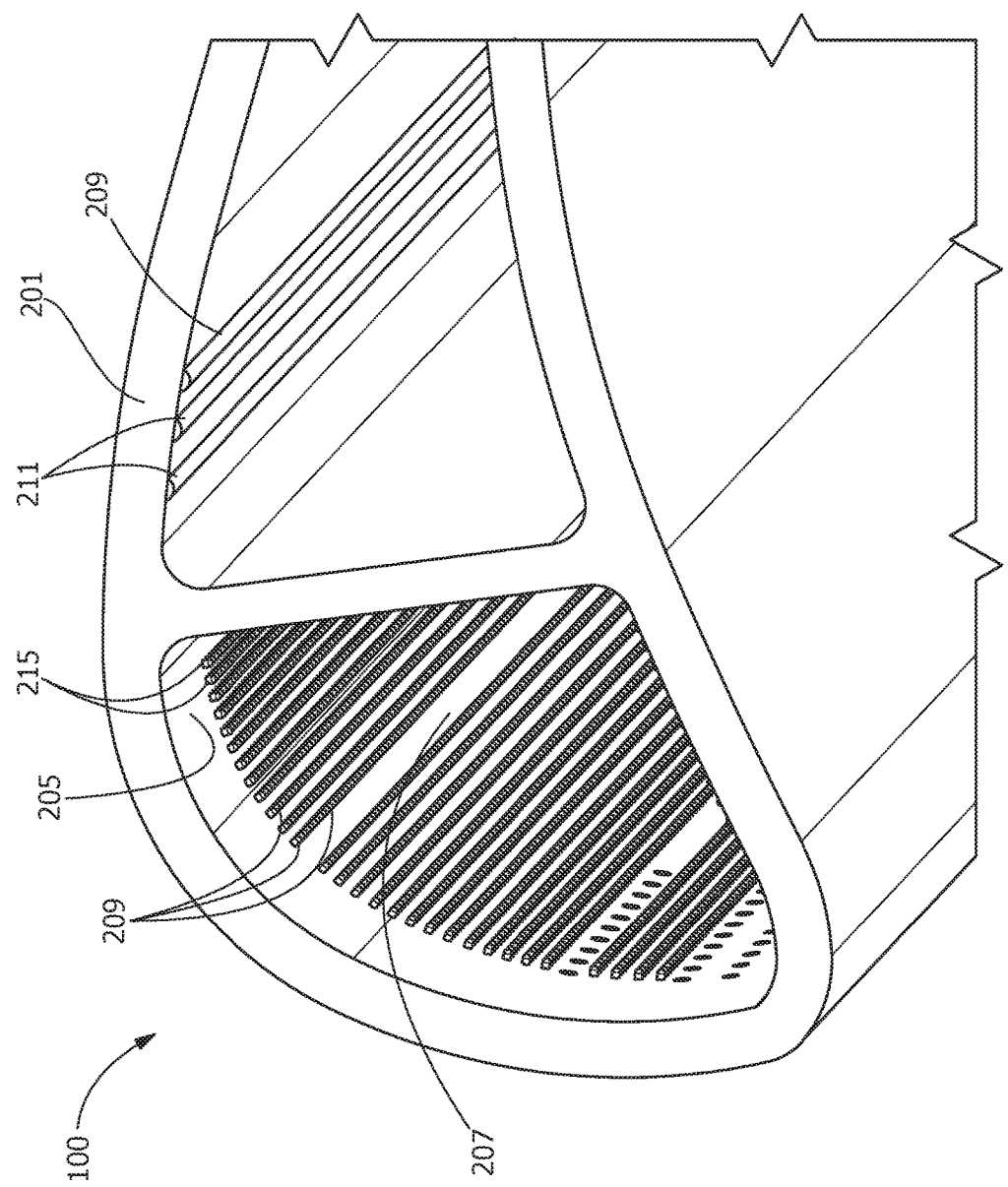
FIG. 3 shows a perspective view of a portion of FIG. 2, according to an embodiment of the disclosure.
Figure 4:
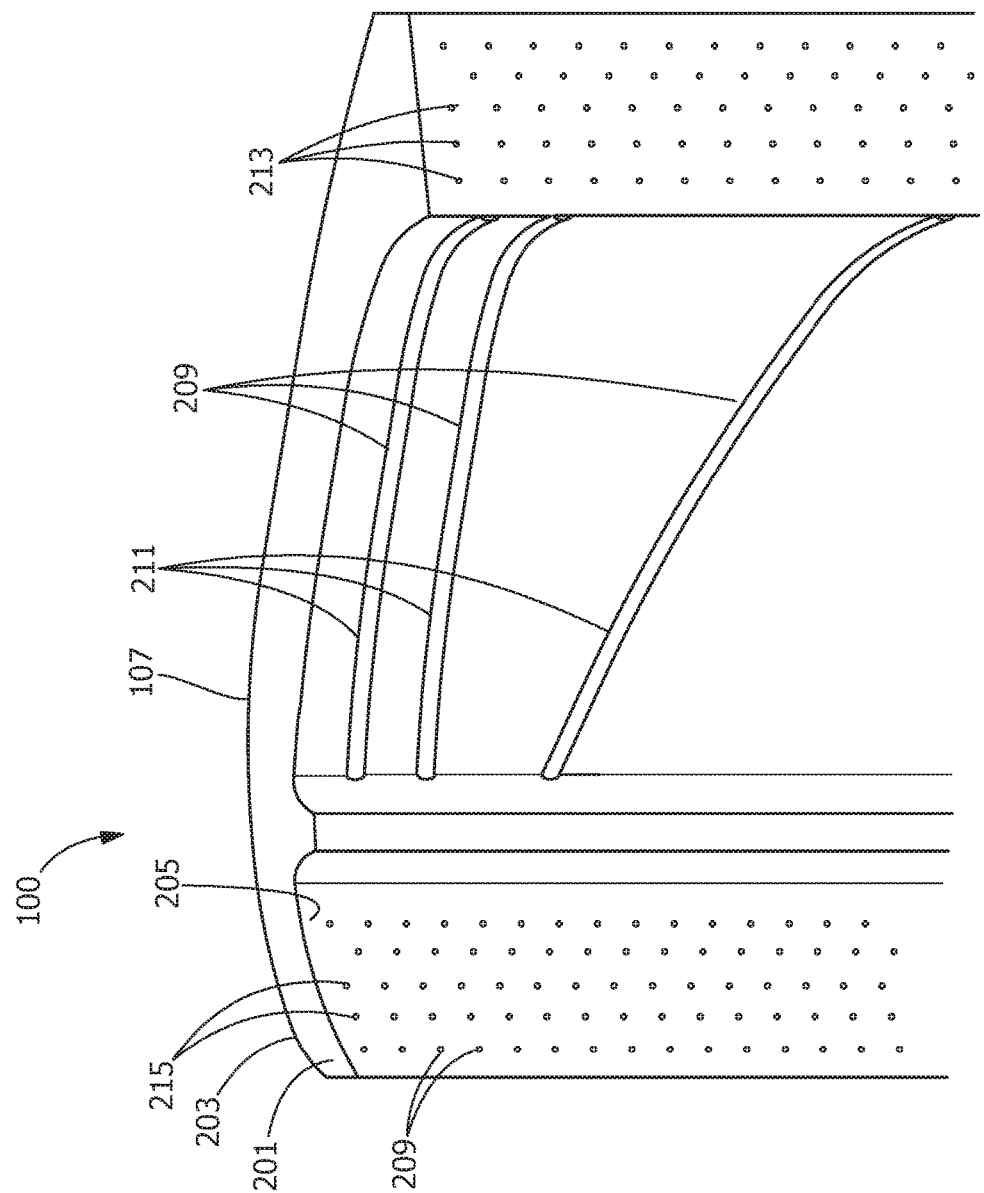
FIG. 4 shows a perspective section view of a portion of FIG. 2, according to another embodiment of the disclosure.

In one embodiment, as illustrated in FIGS. 2-4, the one or more cooling features 209 include a plurality of bumps 215 positioned on the inner surface 205 of the article 100, the plurality of bumps 215 extending from the inner surface 205 into the inner region 207. The bumps 215 are positioned in any suitable arrangement and include any suitable geometric configuration, such as, but not limited to, aligned (FIGS. 2-3), staggered (FIG. 4), regularly spaced, variably spaced, circular, semi-circular, square, irregular, or a combination thereof. In another embodiment, the one or more cooling features 209 include turbulators 211 extending along the inner surface 205 of the body portion 201 in any suitable configuration, such as, but not limited to, radially (FIGS. 2-3), horizontally (FIG. 4), angled from between 0 and 180 degrees relative to the radial direction (FIG. 4), or a combination thereof. Additionally, the turbulators 211 may be continuous and/or intermittently broken along the length of the inner surface 205. In a further embodiment, the one or more cooling features 209 include pins 213 (FIGS. 2 and 4) having any suitable geometry and/or orientation, such as, but not limited to, round, oblong, oval, racetrack, square, irregular, or a combination thereof. The pins 213 extend fully or partially across the inner region 207 (FIG. 2), and may be inline or staggered relative to each other (FIG. 4). In certain embodiments, a plurality of the pins 213 are positioned to form one or more pin banks, as illustrated in FIG. 2. Although shown as a pin bank in FIG. 2, as will be appreciated by those skilled in the art, the pins 213 are not limited to pin bank arrangements, and may include any other arrangement, orientation, or combination thereof.

The one or more cooling features 209 are formed integral with and/or separate from then secured to the body portion 201. When formed separately, the one or more cooling features 209 may be secured directly to the inner surface 205 or they may be formed on an intermediate layer which is secured to the inner surface 205. In another embodiment, the body portion 201 and/or the one or more cooling features 209 include an additive-structured material formed through an additive manufacturing technique. Suitable additive manufacturing techniques include, but are not limited to, direct metal laser melting (DMLM), direct metal laser sintering (DMLS), selective laser melting (SLM), selective laser sintering (SLS), electron beam melting (EBM), fused deposition modeling (FDM), powder jet binder processing, any other additive manufacturing technique, or a combination thereof.

For example, the DMLM technique includes distributing a first layer of a material to a selected region, selectively laser melting the first layer, distributing at least one additional layer of the material over the first layer, and selectively laser melting each of the at least one additional layers. The selective laser melting of the first layer and the at least one additional layer forms the body portion 201 and/or the one or more cooling features 209, with the composition and/or arrangement of the material within each layer providing to the corresponding composition within the article 100. In one embodiment, the material is an atomized powder. In another embodiment, the DMLM is performed in an inert gas atmosphere. Alternatively, FDM includes supplying a material to a nozzle, heating the nozzle, and extruding the material through the nozzle. The heating of the nozzle melts the material as the material passes through the nozzle. Upon extrusion of the material through the nozzle the material hardens, forming the body portion 201 and/or the one or more cooling features 209.

In another example, the powder jet binder processing includes selectively depositing a liquid binding agent to selectively join powder particles within a portion of a powder layer, then adding one or more additional powder layers and selectively depositing the liquid binding agent over each of the additional powder layers. The selective deposition of the liquid binding agent over each of the additional powder layers selectively joins the powder particles within a portion of the powder layer and/or between the powder layers, forming the article 100. The liquid binding agent joins the powder particles without the addition of heat during the build process and/or without a build plate. After joining the powder particles and/or layers during the build process, the article 100 may undergo processing, including curing, sintering, infiltrating, and/or isostatic pressing. The processing solidifies the article 100 and/or increases a density of the article 100 after the build process.

Each of the additive manufacturing techniques forms a near-net shape structure. As used herein "near-net shape" means that the body portion 201 and/or the one or more cooling features 209 are formed very close to the final shape, not requiring significant traditional mechanical finishing techniques such as machining or grinding following the additive manufacturing. The near-net shape of the one or more cooling features 209 may be uniform, substantially uniform, or varied, and includes any suitable cross-sectional shape. Additionally, the cross-sectional shape of each of the one or more cooling features 209 may be the same, substantially the same, or different from the cross-sectional shape of at least one other cooling feature 209 within the inner region 207. Although shown generally as uniform or substantially uniform shaft or rod-shaped bumps 213, as will be appreciated by those skilled in the art, the cooling features 209 are not so limited and may include square, triangular, octagonal, round, circular, semi-circular, cylindrical, conical, hourglass shaped, parabolic shaped, hollow, any other geometric shape, or a combination thereof.

Referring to FIGS. 5-8, the body portion 201 is formed from a first material 501 and each of the one or more cooling features 209 includes a second material 502. In one embodiment, as illustrated in FIG. 5, the one or more cooling features 209 are formed entirely from the second material 502. In another embodiment, the cooling features 209 may be solid 510, hollow 520, or the article 100 may include a combination thereof. Additionally or alternatively, as illustrated in FIGS. 6-8, the one or more cooling features 209 include a combination of materials, such as, but not limited to, a bi-metallic material including the first material 501 and the second material 502. For example, referring to FIG. 6, in one embodiment, the cooling feature 209 includes a layer of the second material 502 disposed on the first material 501. Referring to FIG. 7, in another embodiment, the composition of the cooling feature 209 transitions from the first material 501 to the second material 502 as the cooling feature 209 extends away from the inner surface 205. Referring to FIG. 8, in a further embodiment, an intermediate material 801 is positioned between the cooling feature 209 and the body portion 201, the intermediate material 801 being the same as, substantially the same as, or different from the first material 501 and/or the second material 502. In certain embodiments, the intermediate material 801 facilitates securing of the cooling feature 209 to the body portion 201, such as, for example, by providing a braze paste or foil between a separately formed cooling feature 209 and the body portion 201. As will be appreciated by those skilled in the art, the one or more cooling features 209 are not limited to the examples above, and may include any other combination of materials, such as compositional gradients, other transitional configurations, partial coatings, or a combination thereof.

The first material 501 includes any material having suitable strength, oxidation, and creep properties for continued use in the hot-gas path of a turbine system, such as, but not limited to, gamma prime superalloys, nickel-based superalloys, cobalt-based superalloys, other suitable superalloys, stainless steel, or a combination thereof. Suitable compositions for the first material 501 include, but are not limited to, an alloy, such as a gamma prime superalloy or a stainless steel. In one embodiment, the gamma prime superalloy includes, for example, a composition, by weight, of about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, about 0.05% carbon, about 0.004% boron, and a balance nickel and incidental impurities. In another example, the gamma prime superalloy includes a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, about 0.05% carbon, about 0.004% boron, between about 0.002% and about 0.03% yttrium, and a balance nickel and incidental impurities. In another example, the gamma prime superalloy includes a composition, by weight, of between about 8.0% and about 8.7% chromium, between about 9% and about 10% cobalt, between about 5.25% and about 5.75% aluminum, up to about 0.9% titanium (for example, between about 0.6% and about 0.9%), between about 9.3% and about 9.7% tungsten, up to about 0.6% molybdenum (for example, between about 0.4% and about 0.6%), between about 2.8% and about 3.3% tantalum, between about 1.3% and about 1.7% hafnium, up to about 0.1% carbon (for example, between about 0.07% and about 0.1%), up to about 0.02% zirconium (for example, between about 0.005% and about 0.02%), up to about 0.02% boron (for example, between about 0.01% and about 0.02%), up to about 0.2% iron, up to about 0.12% silicon, up to about 0.1% manganese, up to about 0.1% copper, up to about 0.01% phosphorus, up to about 0.004% sulfur, up to about 0.1% niobium, and a balance nickel and incidental impurities.

The second material 502 includes any material having a greater thermal conductivity as compared to the first material 501. One suitable material for the second material 502 includes copper. Other suitable materials for the second material 502 include, but are not limited to, aluminum, silver, nickel alloys, copper alloys, other alloys having a thermal conductivity greater than that of the first material 501, or a combination thereof. When exposed to the inner region 207, the second material 502 forms a thermally conductive surface that facilitates increased heat transfer and/or cooling of the article 100. Specifically, as cooling fluid passes through the inner region 207 of the article 100, the increased thermal conductivity of the second material 502 increases cooling of the body portion 201 as compared to cooling features 209 formed from the first material 501. Additionally, as compared to traditional cooling features 209 formed from the first material 501, the one or more cooling features 209 including the second material 502 provide increased cooling effectiveness, increase system performance, or a combination thereof. Furthermore, by increasing cooling efficiency and/or effectiveness, the cooling features 209 including the second material 502 facilitate cooling of the article 100 with a decreased cooling flow, which increases operating efficiency of the system.

Although the thermal conductivity of the second material 502 is relatively greater than the first material 501, the thermal and/or mechanical resistance of the second material 502 may be the same, substantially the same, or different from that of the first material 501. For example, in certain embodiments, the body portion 201 completely surrounds the one or more cooling features 209, decreasing exposure of the second material 502 to the thermal and/or mechanical stresses of the operating environment surrounding the article 100. The decreased exposure of the second material 502 to the thermal and/or mechanical stresses of the operating environment permits the use of materials having increased thermal conductivity with decreased thermal and/or mechanical resistance as compared to the first material 501 of the body portion 201.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. An article, comprising:
    a body portion having an inner surface and an outer surface, the inner surface defining an inner region; and
    at least one cooling feature positioned within the inner region,
    wherein the body portion includes a first material and the at least one cooling feature consists of a second material selected from the group consisting of aluminum, silver, copper, copper alloys, and combinations thereof, the second material having a higher thermal conductivity than the first material.

2. The article of claim 1, wherein the second material provides increased cooling effectiveness as compared to the first material.

3. The article of claim 1, wherein the at least one cooling feature is integral with the body portion.

4. The article of claim 3, wherein at least one of the body portion and the at least one cooling feature includes an additive manufacturing microstructure.

5. The article of claim 1, wherein the at least one cooling feature is selected from the group consisting of pin banks, turbulators, bumps, fins, and combinations thereof.

6. The article of claim 1, wherein the second material includes copper.

7. The article of claim 1, wherein the article is a gas turbine component.

8. The article of claim 7, wherein the gas turbine component is selected from the group consisting of an airfoil, a bucket, a nozzle, a shroud, and combinations thereof.

9. The article of claim 1, further comprising an intermediate material positioned between the body portion and the at least one cooling feature.

10. The article of claim 1, wherein each of the at least one cooling features is hollow.

11. An article, comprising:
a body portion having an inner surface and an outer surface, the inner surface defining an inner region; and
at least one cooling feature positioned within the inner region,
wherein the body portion includes a first material and the at least one cooling feature includes the first material and a second material, the second material having a higher thermal conductivity than the first material, and
wherein the cooling feature includes a material gradient with a relatively increased amount of the first material proximal to the inner surface of the body portion, and a relatively increased amount of the second material distal from the inner surface.

12. The article of claim 11, wherein the first material forms a proximal portion of the cooling feature extending from the inner surface and the second material forms a distal portion of the cooling feature extending from the proximal portion.

13. The article of claim 11, wherein the at least one cooling feature is integral with the body portion.

14. The article of claim 13, wherein at least one of the body portion and the at least one cooling feature includes an additive manufacturing microstructure.

15. The article of claim 11, wherein the at least one cooling feature is selected from the group consisting of pin banks, turbulators, bumps, fins, and combinations thereof.

16. The article of claim 11, wherein the second material includes copper.

17. The article of claim 11, wherein the article is a gas turbine component.

18. The article of claim 17, wherein the gas turbine component is selected from the group consisting of an airfoil, a bucket, a nozzle, a shroud, and combinations thereof.

19. The article of claim 11, further comprising an intermediate material positioned between the body portion and the at least one cooling feature.

20. The article of claim 11, wherein each of the at least one cooling features is hollow.

* * * * *